United States Patent
Li et al.

(10) Patent No.: US 10,460,755 B2
(45) Date of Patent: Oct. 29, 2019

(54) PERPENDICULAR RECORDING MEDIUM WITH OXIDE GRADIENT LAYER

(71) Applicant: Seagate Technology LLC, Cupertino, CA (US)

(72) Inventors: Pengcheng Li, Fremont, CA (US); Bin Lu, San Ramon, CA (US); Thomas P. Nolan, Fremont, CA (US); Li-Lien Lee, Saratoga, CA (US); Jai-Young Kim, San Ramon, CA (US)

(73) Assignee: Seagate Technology LLC, Cupertino, CA (US)

(*) Notice: Subject to any disclaimer, the term of this patent is extended or adjusted under 35 U.S.C. 154(b) by 698 days.

(21) Appl. No.: 14/055,640

(22) Filed: Oct. 16, 2013

(65) Prior Publication Data

US 2014/0044993 A1    Feb. 13, 2014

(51) Int. Cl.
| | | |
|---|---|---|
| *G11B 5/66* | (2006.01) | |
| *G11B 5/65* | (2006.01) | |
| *G11B 5/82* | (2006.01) | |
| *H04W 4/04* | (2009.01) | |
| *H04W 4/021* | (2018.01) | |
| *G06Q 30/02* | (2012.01) | |
| *G06Q 30/06* | (2012.01) | |
| *G06Q 10/08* | (2012.01) | |
| *G06Q 10/02* | (2012.01) | |
| *G06Q 20/32* | (2012.01) | |

(Continued)

(52) U.S. Cl.
CPC ............... *G11B 5/66* (2013.01); *G11B 5/65* (2013.01); *G11B 5/656* (2013.01); *H04W 4/04* (2013.01); *G06Q 10/02* (2013.01); *G06Q 10/083* (2013.01); *G06Q 20/3224* (2013.01); *G06Q 30/0261* (2013.01); *G06Q 30/0267* (2013.01); *G06Q 30/0617* (2013.01); *G06Q 30/0635* (2013.01); *G06Q 30/0641* (2013.01); *G06Q 50/12* (2013.01); *G11B 5/82* (2013.01); *H04L 12/1859* (2013.01); *H04W 4/021* (2013.01)

(58) Field of Classification Search
CPC .... G11B 5/66; G11B 5/65; G11B 5/82; G11B 5/656
See application file for complete search history.

(56) References Cited

U.S. PATENT DOCUMENTS

| | | |
|---|---|---|
| 6,468,670 B1 | 10/2002 | Ikeda et al. |
| 7,201,977 B2 | 4/2007 | Li et al. |
| 8,119,263 B2 | 2/2012 | Nolan et al. |

(Continued)

FOREIGN PATENT DOCUMENTS

JP    WO 2011093233 A1 * 8/2011 ............. G11B 5/314

*Primary Examiner* — Holly C Rickman
*Assistant Examiner* — Lisa Chau
(74) *Attorney, Agent, or Firm* — Hall Estill Attorneys at Law

(57) ABSTRACT

Apparatus for recording data and method for making the same. In accordance with some embodiments, a recording layer is supported by a substrate. The recording layer has a granular magnetic recording layer with a first oxide content, a continuous magnetic recording layer with nominally no oxide content, and an oxide gradient layer disposed between the respective granular magnetic recording layer and the continuous magnetic recording layer. The oxide gradient layer has a second oxide content less than the first oxide content of the granular layer.

11 Claims, 5 Drawing Sheets

(51) Int. Cl.
 *G06Q 50/12* (2012.01)
 *H04L 12/18* (2006.01)

(56) References Cited

U.S. PATENT DOCUMENTS

| | | |
|---|---|---|
| 8,298,689 B2 | 10/2012 | Sonobe et al. |
| 8,367,228 B2 | 2/2013 | Sonobe et al. |
| 8,404,368 B2 | 3/2013 | Wu et al. |
| 2006/0204791 A1* | 9/2006 | Sakawaki ............... G11B 5/65 428/828.1 |
| 2010/0062286 A1* | 3/2010 | Suess ................... B82Y 25/00 428/800 |
| 2010/0323220 A1* | 12/2010 | Onoue ................... G11B 5/65 428/800 |
| 2011/0311841 A1* | 12/2011 | Saito ...................... G11B 5/65 428/848.1 |
| 2012/0300600 A1* | 11/2012 | Kanbe ................... G11B 5/314 369/13.32 |
| 2013/0045394 A1 | 2/2013 | Girt et al. |

\* cited by examiner

PERPENDICULAR RECORDING MEDIUM WITH OXIDE GRADIENT LAYER

SUMMARY

Various embodiments of the present disclosure are generally directed to an apparatus for recording data and method for making the same.

In accordance with some embodiments, a recording layer is supported by a substrate. The recording layer comprises a granular magnetic recording layer having a first oxide content, a continuous magnetic recording layer having nominally no oxide content, and an oxide gradient layer disposed between the respective granular magnetic recording layer and the continuous magnetic recording layer. The oxide gradient layer has a second oxide content less than the first oxide content of the granular layer.

These and other features of various embodiments can be understood from a review of the following detailed description in conjunction with the accompanying drawings.

DETAILED DESCRIPTION

Figure 1:
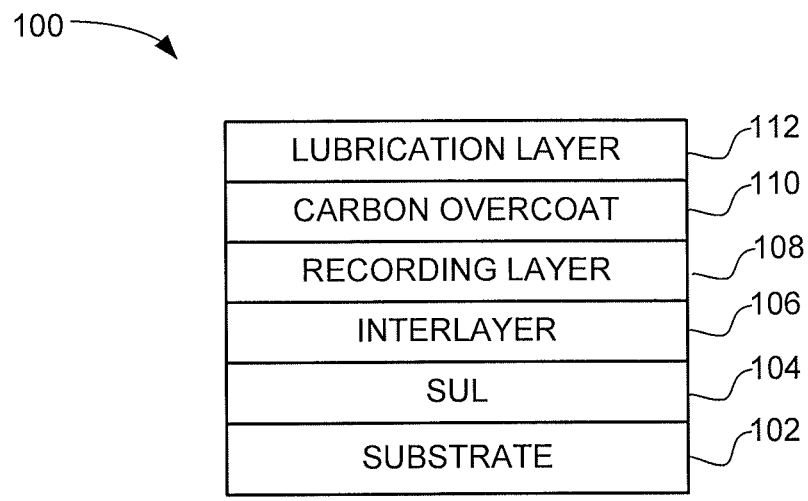
FIG. 1 illustrates a perpendicular recording medium in accordance with some embodiments.

The present disclosure is generally directed to perpendicular data recording systems. In a perpendicular recording system, a magnetic sequence is written to a recording structure of a medium with magnetic domains (bits) having magnetization in a direction generally perpendicular to the surface of the medium.

High density perpendicular recording media can require careful control and balance of several magnetic properties, such as but not limited to the following: lateral exchange coupling low enough to maintain small cluster size; lateral exchange coupling high enough to achieve narrow switching field distribution (SFD); magnetic anisotropy (Ku) high enough to enable thermal stability and ensure capability with a high gradient recording head; switching field (Hsw) low enough to enable writability by a write head; and grain-to-grain uniformity of magnetic anisotropy field (Hk) and lateral exchange coupling within sufficient limits to achieve narrow switching field distributions (SFDs).

Some perpendicular recording media employ "granular" magnetic layer with high Hk and low lateral exchange coupling achieved by an oxide based grain boundary phase separating magnetic grain cores, and a "continuous" magnetic layer above the granular magnetic layer to tune average lateral exchange coupling, reduce SFD and improve writability of the combined layers. The combined structure is sometimes called a continuous granular composite (CGC) media, and the continuous layer comprising nearly continuous grains separated by approximately 0 vol % oxide grain boundaries is sometimes called the CGC layer.

In some cases, the lower granular magnetic layer may have an oxide content on the order of about 15-30 vol %, while the upper continuous magnetic layer has substantially no (0 vol %) oxide content. It has been found by the present inventors that an abrupt change in oxide component between these layers can introduce variations in grain to grain magnetic properties in the CGC layer. Such variations in the CGC layer can degrade uniformity of the magnetic properties of the complete recording layer stack, and correspondingly limit media recording performance and bit density capability.

Accordingly, various embodiments of the present disclosure are generally directed to an improved perpendicular recording medium and a method for making the same. As explained below, in some embodiments a granular magnetic recording layer is supported by a substrate. The granular magnetic recording layer has a first amount of oxide content (e.g., 15-30 vol %). A continuous magnetic recording layer is formed over the granular magnetic recording layer and has nominally no oxide content (0 vol %).

An oxide gradient layer is disposed between the granular magnetic recording layer and the continuous magnetic recording layer, the oxide gradient layer having a second amount of oxide content (e.g, 5-15 vol %) that is less than the first amount. The oxide gradient layer rapidly reduces the oxide volume while maintaining the microstructure formed by the two-phase metal+oxide deposition; this maintains the position of the oxide grain boundaries, but reduces the width of the widest oxide boundaries owing to a lack of available oxide material, and thus reduces the variation of grain boundary width at the top of the gradient oxide layer as compared to the top of the lower granular oxide layer. Accordingly, the reduced variations in grain boundary sizes of the gradient layer provide correspondingly reduced variations in the CGC continuous magnetic layer.

In some cases, the granular magnetic recording layer (granular layer) can be formed of at least a magnetic material and an oxide, with the oxide content being about 20-25 vol %. The oxide forms grain boundaries to separate magnetic grains formed from the magnetic material.

The oxide gradient layer can similarly be formed of a magnetic material and an oxide, with the oxide content being about 5-10 vol %. The oxide content forms grain boundaries that align with the grain boundaries of the granular layer, and serve to reduce variation therein adjacent the boundary of the continuous magnetic recording layer (continuous layer). The continuous layer may also include a magnetic material and may be a continuous granular composite (CGC) layer.

In further embodiments, both the granular layer and the oxide gradient layer are formed of CoCrPt-oxide, with different respective amounts of oxide. In still further embodiments, a break layer, sometimes referred to as a vertical exchange tuning layer, is disposed between the granular layer and the oxide gradient layer and/or between the oxide gradient layer and the continuous layer to tune vertical exchange coupling (J) by lowering saturation magnetic moment (Ms).

FIG. 1 is a schematic depiction of various layers of a perpendicular recording medium 100 in accordance with some embodiments. Other media configurations can be used.

It is contemplated that the medium 100 is configured to record data in a data recording system that uses a moveable recording head to write data to the medium in the form of perpendicularly magnetized magnetic domains as the medium is rotated about a central axis. Without limitation, it is contemplated that the medium may take the form of continuous granular composite (CGC) media, exchange coupled composite (ECC) media, ECC+CGC media, heat assisted magnetic recording (HAMR) media, bit patterned media (BPM), longitudinal or tilted media, multilayer media, etc.

FIG. 1 shows illustrative layers that include a substrate 102, a soft underlayer (SUL) 104, an interlayer 106, a magnetic recording layer 108, a protective carbon overcoat (COC) and a lubrication layer 112. Any number of additional layers can be incorporated including, without limitation, seed layers, antiferromagnetic (AFM) coupling layers, diffusion barrier layers, etc. Each depicted layer in FIG. 1 may be formed from multiple sub-layers having the same or different material constructions.

The substrate 102 provides mechanical support for the medium 100. Data are recorded to the recording layer 108 in the perpendicular direction. The interlayer 106 can operate to align a magnetic easy axis for the recording layer 108, and the SUL 104 provides a return path for magnetic flux during a recording operation.

Figure 2:
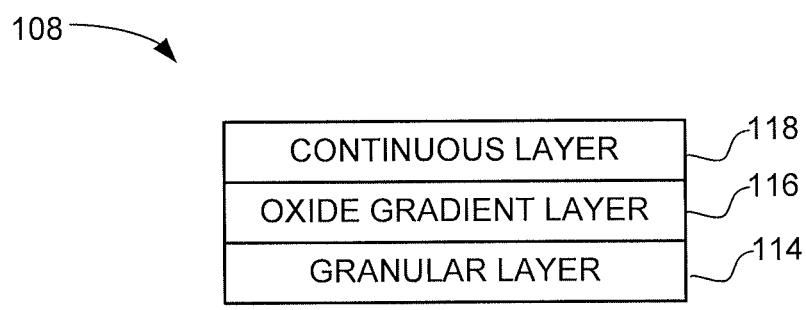
FIG. 2 illustrates a recording layer of the medium of FIG. 1 in accordance with some embodiments.

An example configuration for the recording layer 108 is shown in FIG. 2. The recording layer 108 includes a first granular oxide magnetic recording (granular) layer 114, a second granular oxide magnetic recording (oxide gradient) layer 116, and a continuous magnetic recording (continuous) layer 118. The oxide gradient layer 116 is contactingly disposed between the granular layer 114 and the continuous layer 118.

The granular layer 114 may include magnetic material(s) such as Co, Fe, Ni, etc., non-magnetic materials such as Cr, Pt, B, etc., and has a first, relatively larger amount of oxide component. In some cases, the granular layer takes the form of CoCrPt-oxide with an oxide component on the order of about 20-25 vol %. The oxide forms grain boundaries that separate the magnetic grains, and so the percentage of oxide represents the volume of the grain boundaries within the associated layer. In other cases, the oxide component may be on the order of about 15-30 vol %. Other suitable ranges can be used.

The oxide gradient layer 116 has a second, relatively smaller oxide component, such as oxide on the order of about 5-10 vol %. The oxide gradient layer 116 may also take the form of CoCrPt-oxide. The oxide gradient layer 116 may be made of the same materials as the granular layer 114 so that the only substantive difference is the relative amounts of oxide. Alternatively, the gradient layer 116 may include different materials as compared to the granular layer 114. In other cases, the oxide component of the oxide gradient layer 116 may be on the order of about 5-15 vol %, about 6-12 vol %, or some other suitable range.

The continuous layer 118 may take the form of a continuous granular composite (CGC) layer and may be formed of a variety of non-oxide materials such as CoCr, CoPt, CoCrB, CoCrPt, etc. Other non-oxide constructions can be used. Each of the respective layers 114, 116 and 118 are thin-film layers that can be deposited using known deposition processes.

While not necessarily limiting, it is contemplated that the oxide gradient layer 116 will be significantly thinner in the perpendicular direction as compared to the respective thicknesses of the granular layer 114 and the continuous layer 118. In some embodiments, the oxide gradient layer 116 may be on the order of a few Angstroms (e.g., about 5-25 Å, etc.) in thickness, the granular layer 114 may be on the order of a few nanometers (e.g., about 5-15 nm, etc.) in thickness, and the continuous layer 118 may also be on the order of a few nanometers (e.g., about 2-10 nm, etc.) in thickness. Providing a relatively thinner oxide gradient layer 116 as compared to the granular and continuous layers 114, 118 reduces the effects of variations in grain boundaries in the granular layer while ensuring coupling between the granular and continuous layers and ensuring that the combined recording layer magnetic properties are primarily controlled by the granular and continuous layer properties and thicknesses.

Figure 3:
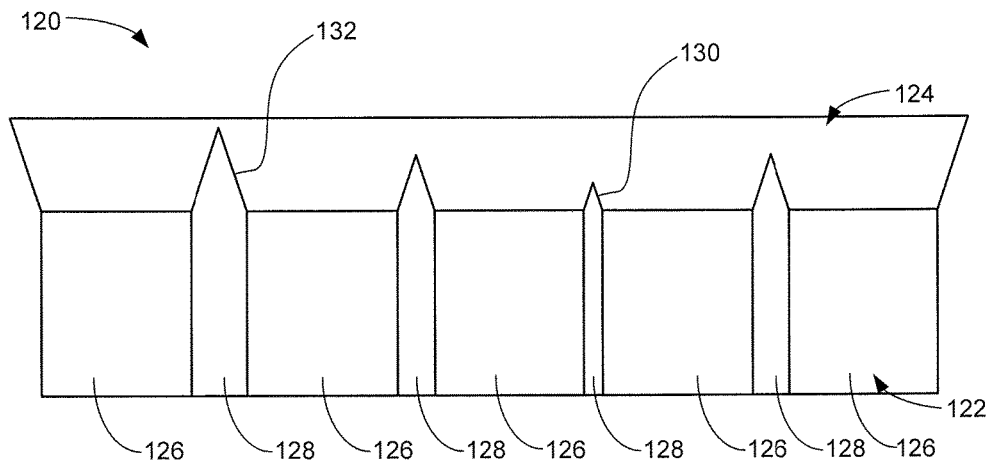
FIG. 3 illustrates aspects of a perpendicular recording medium.

FIG. 3 is an illustrative diagram showing aspects of another perpendicular recording medium 120. The medium 120 includes a granular oxide magnetic recording (granular) layer 122 and a continuous magnetic recording (continuous) layer 124. The respective features depicted in FIG. 3 are exaggerated and are not drawn to scale.

The lower granular layer 122 includes magnetic grains 126 separated by non-magnetic (oxide-based) grain boundaries 128. The respective thicknesses and spacings of the granular layer grain boundaries 128 can vary as shown. Because the constituent components of the non-oxide based continuous layer 124 do not easily bond with the oxide components of the granular layer grain boundaries 128, the inter-granular coupling introduced by the continuous layer 124 is not uniform, but instead varies generally in relation to the respective thicknesses of the granular layer grain boundaries 128. A relatively high level of magnetic coupling may be present adjacent transition region 130, while a relatively low level of magnetic coupling may be present adjacent transition region 132.

Such variations can arise in part due to the relatively abrupt differences in oxide content between the respective layers 122, 124. This can induce a number of undesirable effects such as broad exchange coupling distributions, wide switching field distributions, increased noise and reduced signal-to-noise (SNR) levels, etc.

Figure 4:
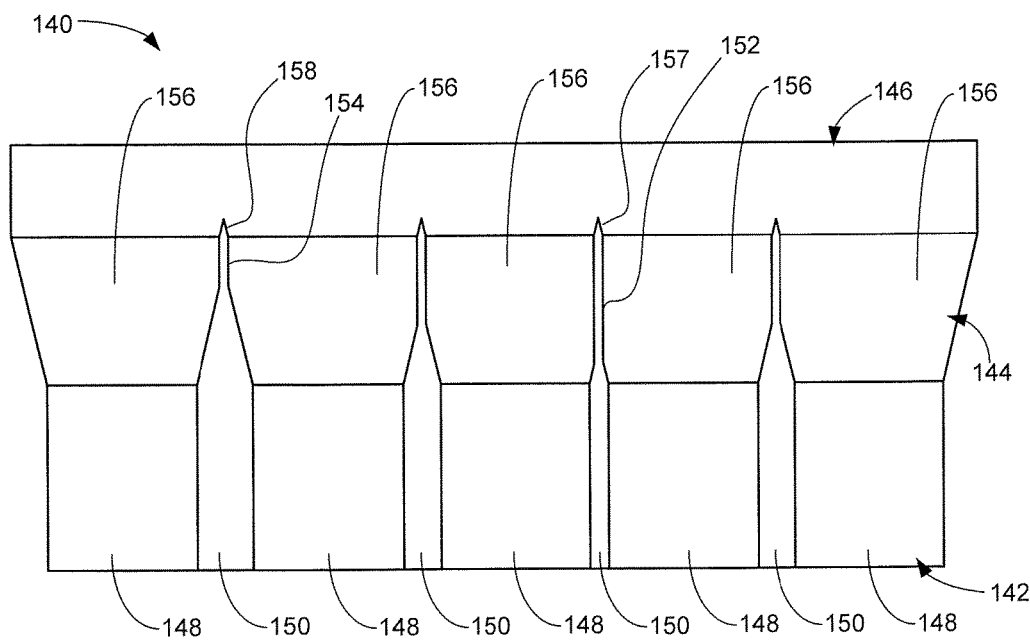
FIG. 4 illustrates aspects of another perpendicular recording medium.

FIG. 4 is an illustrative diagram of aspects of another perpendicular magnetic recording medium 140. The medium 140 can correspond to the medium 100 of FIG. 1 and includes a first granular oxide magnetic recording (granular) layer 142, a second granular oxide magnetic recording (oxide gradient) layer 144, and a continuous magnetic recording (continuous) layer 146. As before, the respective features depicted in FIG. 4 are exaggerated and are not drawn to scale. The oxide gradient layer 144 is disposed between the granular layer 142 and the continuous layer 146. As before, the granular layer 142 includes magnetic grains 148 separated by non-magnetic, oxide-based grain boundaries 150.

The oxide content of the oxide gradient layer 144 is greater than that of the continuous layer 146 and less than that of the granular layer 142. This allows the oxide component of the oxide gradient layer 144 to extend and narrow the grain boundaries 150 of the granular layer 142. During deposition, the oxide component of the gradient layer 144 will be attracted to the topmost exposed grain boundaries 150 of the lower granular layer 142 and form grain boundaries in the oxide gradient layer 144 such as 152, 154. Because of the reduced amount of oxide in the oxide gradient layer 144, the grain boundaries will tend to narrow and become more uniform, as represented in FIG. 4. The magnetic component of the oxide gradient layer 144 will organize into grains 156 which tend to align with the grains 148 in the granular layer 142. This provides greater uniformity in the transition regions in the continuous layer 146, as can be seen by a comparison of transition regions 157 and 158 with transition regions 130 and 132 of FIG. 3.

Figure 5:
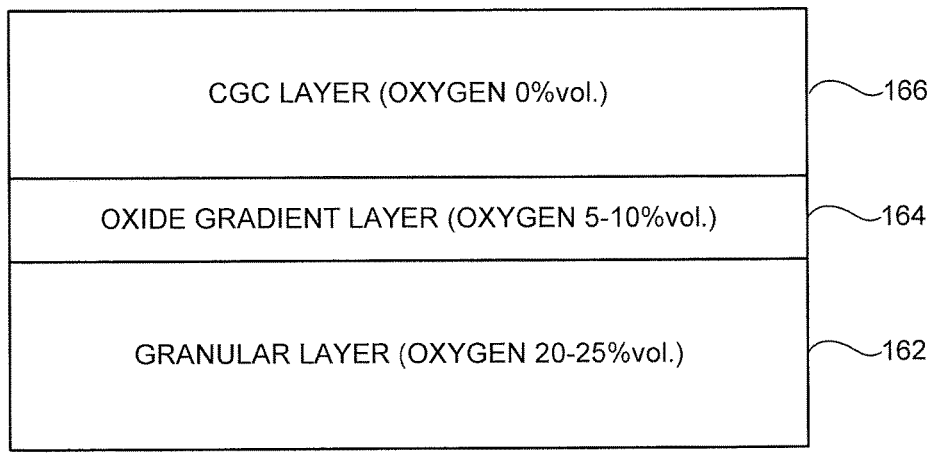
FIG. 5 illustrates aspects of another perpendicular recording medium.

FIG. 5 provides another depiction of a recording layer 160. As before, the respective features depicted in FIG. 5 are exaggerated and are not drawn to scale. The recording layer includes a lower granular layer 162 with an oxide content of from about 20 vol % to about 25 vol %, a single oxide gradient layer 164 with an oxide content of from about 5 vol % to about 10 vol %, and a continuous (CGC) layer 166 with an oxide content of about 0 vol %. Each of the granular and CGC layers 162, 166 may be made up of a single layer or multiple layers.

FIG. 5 provides a stepwise gradient reduction profile in the amount of oxide from the granular layer 162 to the CGC layer 166, with essentially a single intermediate level at the intervening oxide gradient layer 164. That is, the oxide content transitions from about 20-25 vol % (granular layer 162), to about 5-10 vol % (oxide gradient layer 164), and then to about 0 vol % (continuous layer 166).

Figure 6:
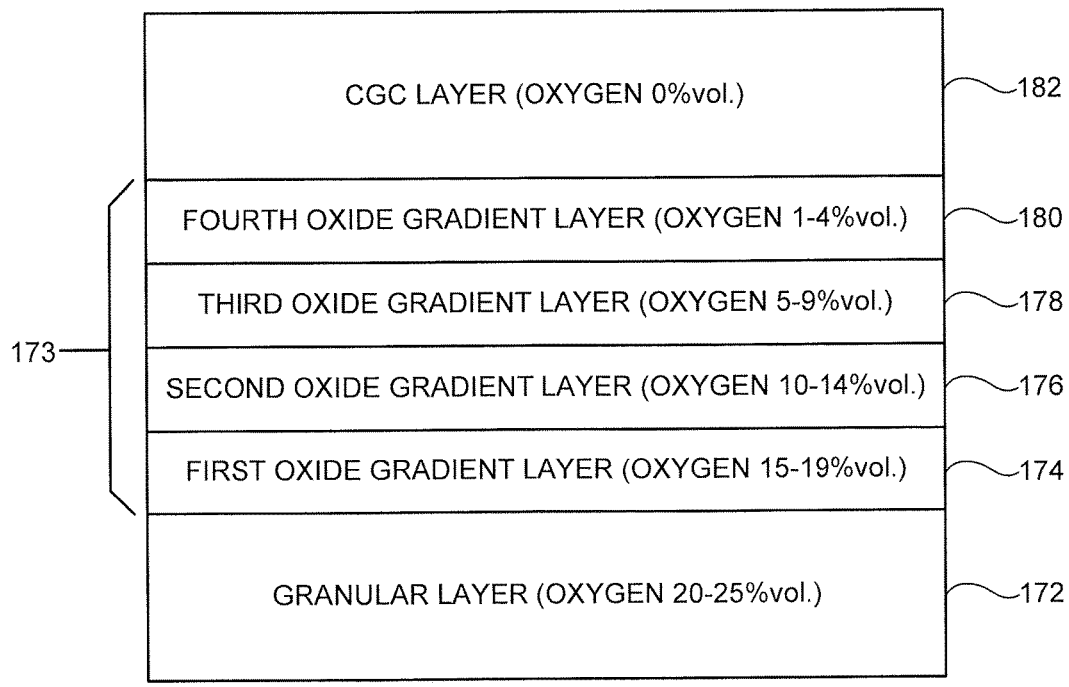
FIG. 6 illustrates aspects of another perpendicular recording medium.

FIG. 6 depicts another recording layer 170. As before, the respective features depicted in FIG. 6 are exaggerated and are not drawn to scale. The recording layer includes a lower granular layer 172, an oxide gradient layer 173 made up of first through fourth oxide gradient layers 174-180, and a continuous (CGC) layer 182. The recording layer 170 uses multiple oxide gradient layers (sub-layers) to provide multiple, successively decreased levels of oxide from the granular layer 172 to the CGC layer 182. As mentioned above, multiple granular and CGC layers can be used. Any number of intermediate oxide gradient sublayers can be employed to tailor the gradient reduction profile.

Figure 7:
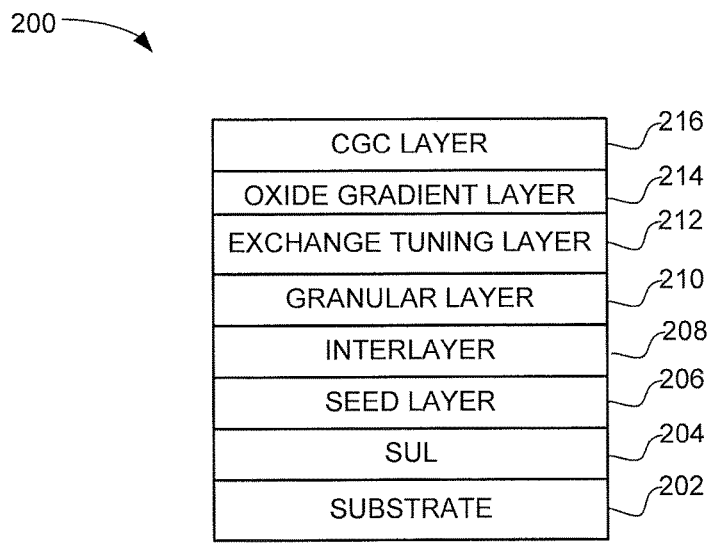
FIG. 7 illustrates aspects of another perpendicular recording medium.

FIG. 7 is another perpendicular recording medium 200. Once again, the various features depicted in FIG. 7 are exaggerated and are not drawn to scale such that the relative thickness of each layer with respect to the other depicted layers may not be accurate. The medium 200 is shown to include substrate layer 202, a soft underlayer (SUL) 204, a seed layer 206, an interlayer 208, a granular magnetic recording layer (granular layer) 210, a vertical exchange tuning layer 212, an oxide gradient layer 214 and a continuous (CGC) layer 216. Other layers may be provided as well such as a carbon overcoat layer, a lubricant layer, etc. but have been omitted for clarity. As before, the drawing is not drawn to scale and each layer may have its own relative thickness with respect to the other depicted layers.

The granular layer 210 and the oxide gradient layer 214 can both be formed of CoCrPt-oxide with different respective amounts of oxide component as discussed above. The vertical exchange tuning layer 212 may be located above and/or below oxide gradient layer 214, can have an oxide component or can be oxide free, and operates to control exchange between the CGC layer 216 and the granular layer 210 by adjusting the magnetic moment and the concentration of magnetic atoms in a thin layer or interface between/connecting the two magnetic layers in close proximity.

Figure 8:
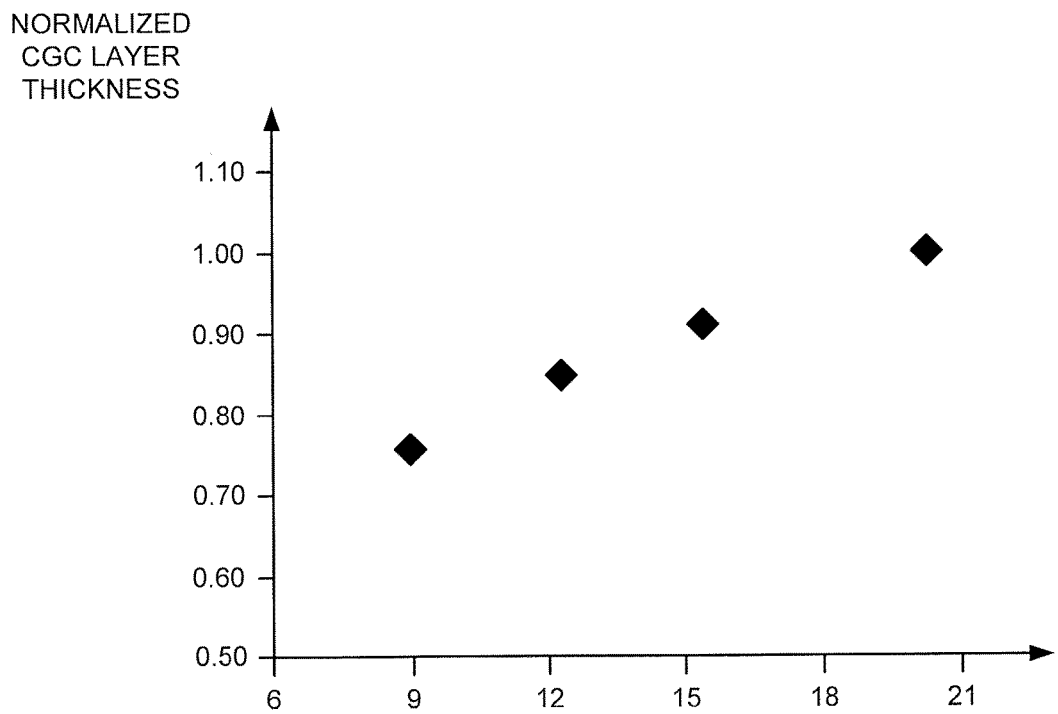
FIG. 8 illustrates data associated with the medium of FIG. 7.

FIG. 8 is a graphical representation of data associated with the perpendicular recording medium 200 of FIG. 7. FIG. 8 shows the reduction of the thickness of the CGC layer 216 (normalized) versus the oxide volume of the oxide gradient layer 214 to provide media with a desired constant property such as lateral exchange coupling, He, etc. within a selected range.

It can be seen that, generally, the use of smaller relative amounts of oxide component in the oxide granular layer 214 allows a significant reduction in the required thickness of the CGC layer 216 to maintain the desired property. For example, the use of a thin oxide gradient layer having an oxide component of about 9 vol % may allow the thickness of the CGC layer 216 to be reduced by about 25% as compared to a structure with no oxide gradient layer 214 and an oxide content of about 20 vol % in the underlying granular layer 210.

Figure 9:
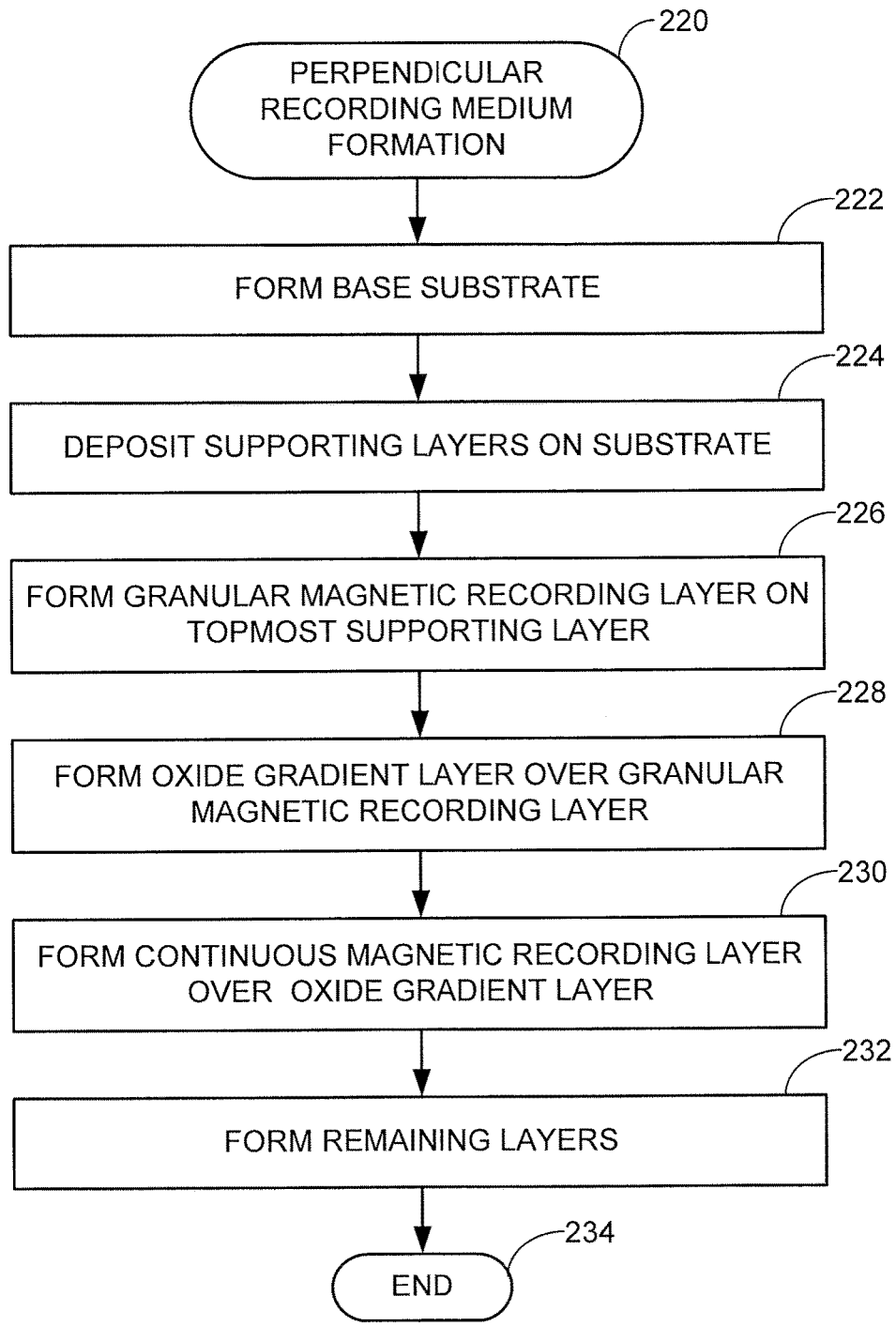
FIG. 9 is a flow chart for a routine used to form a perpendicular recording medium in accordance with some embodiments.

FIG. 9 is a flow chart for a PERPENDICULAR RECORDING MEDIUM FORMATION routine 220 carried out in accordance with some embodiments to form perpendicular magnetic recording media as discussed above. The various steps shown in FIG. 9 are exemplary and can be omitted or modified, and other steps can be added as desired.

A base substrate is provided at step 222. The base substrate may be formed of glass, aluminum or other suitable material, and forms a rigid foundation for remaining layers of the medium. The substrate may be subjected to processing such as cutting, polishing, chemical treatment, etc. Exemplary substrates are depicted at 102 in FIG. 1 and at 202 in FIG. 7.

One or more supporting layers are formed on the substrate at step 224. These can take a variety of forms including one or more of each of the following: seed layers, soft underlayers (SULs), intermediate layers, diffusion barrier layers, control layers, anti-ferromagnetic layers, etc. Exemplary supporting layers include layers 104-106 in FIG. 1 and layers 204-208 in FIG. 7. The supporting layers may be formed of a variety of magnetic and/or non-magnetic materials. One or more deposition chambers can be used to deposit the respective materials to form the layers using a variety of processes such as sputtering, chemical vapor deposition (CVD), physical vapor deposition (PVD), etc.

A first granular magnetic recording layer is formed on the topmost supporting layer at step 226. The granular magnetic recording layer (granular layer) includes a magnetic material that separates into magnetic grains (e.g., 148, FIG. 4) and one or more non-magnetic materials including oxide that form grain boundaries (e.g., 150, FIG. 4). The granular layer has a first, relatively higher oxide content, such as but not limited to about 20-25 vol %. A suitable composition is CoCrPt-oxide, although other forms can be used.

A second granular magnetic recording layer is formed above the first granular magnetic recording layer at step 228. The second granular magnetic recording layer (oxide gradient layer) may be substantially thinner than the first granular magnetic recording layer and may be formed of the same constituent elements as the first granular magnetic recording layer, or may have a different elemental construction. The oxide gradient layer includes a magnetic material that separates into magnetic grains and an oxide-based non-magnetic material that forms grain boundaries, as represented in FIG. 4. As noted above, multiple deposition steps can be carried out in succession to provide successive sub-layers with decreased oxide content levels, as discussed above in FIG. 6. The oxide gradient layer can be formed of CoCrPt-oxide or can take some other form.

While not shown in FIG. 9, other layers such as the vertical (layer-to-layer) exchange tuning layer 214 in FIG. 7 can be formed between the respective granular layer and the oxide gradient layer, or between the oxide gradient layer and the continuous layer. In other embodiments, the oxide gradient layer is formed directly on the granular layer.

A continuous magnetic recording layer is formed above the oxide gradient layer at step 230. This can take the form of a CGC layer. The continuous layer includes substantially no oxide content. The respective layers from steps 226, 228 and 230 form a recording layer for the medium.

Remaining layers can be formed at step 232, such as a protective overcoat layer, a lubricant layer, etc. The routine then ends at step 234.

It will now be appreciated that providing an oxide gradient layer between a granular layer and a continuous layer can reduce a steep transition in oxide content through a stack, thereby reducing the effects of variations in grain boundary sizes in the granular layer at the continuous layer. It has been found that a relatively thin oxide gradient layer is sufficient to significantly optimize performance of a recording layer with granular and continuous layer components.

Numerous characteristics and advantages of various embodiments of the present disclosure have been set forth in the foregoing description, together with structural and functional details. Nevertheless, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
    a substrate;
    a recording layer supported by the substrate and comprising a granular magnetic recording layer, a continuous magnetic recording layer, and an oxide gradient layer, the granular magnetic recording layer comprising a first material having a first oxide content, and the oxide gradient layer disposed between the respective granular magnetic recording layer and the continuous magnetic recording layer, the oxide gradient layer comprising a third material having a second oxide content that is greater than zero and less than the first oxide content; and
    a non-magnetic grain boundary continuously extending from the granular magnetic recording layer through the oxide gradient layer into, but not completely through, the continuous magnetic recording layer, the continuous magnetic recording layer comprising a second material having nominally no oxide content other than the non-magnetic grain boundary.

2. The apparatus of claim 1, wherein the continuous magnetic recording layer is a continuous granular composite (CGC) layer.

3. The apparatus of claim 1, wherein the first oxide content is about 20-25 vol %.

4. The apparatus of claim 1, wherein the granular magnetic recording layer and the oxide gradient layer share a common elemental construction apart from different amounts of oxide in the respective layers.

5. The apparatus of claim 1, wherein the oxide gradient layer has a thickness significantly less than respective thicknesses of each of the granular magnetic recording layer and the continuous magnetic recording layer.

6. The apparatus of claim 1, wherein the granular magnetic recording layer is formed of CoCrPt-oxide.

7. The apparatus of claim 6, wherein the oxide gradient layer is formed of CoCrPt-oxide.

8. The apparatus of claim 1, further comprising an exchange tuning layer contactingly disposed between the granular magnetic recording layer and the oxide gradient layer.

9. The apparatus of claim 1, wherein the oxide gradient layer is formed of a plurality of stacked sub-layers, each of the plurality of sub-layers having a respective oxide content, the respective oxide contents decreasing in relation to distance from the granular magnetic recording layer.

10. The apparatus of claim 1, wherein the granular magnetic recording layer comprises a plurality of magnetic grains separated by a plurality of non-magnetic grain boundaries, wherein the oxide gradient layer comprises a corresponding plurality of magnetic grains aligned with the plurality of magnetic grains in the granular magnetic recording layer and a corresponding plurality of non-magnetic grain boundaries aligned with the plurality of non-magnetic grain boundaries in the granular magnetic recording layer, the plurality of non-magnetic grain boundaries in the oxide gradient layer reducing variation in sizes of the granular magnetic recording layer at the continuous magnetic recording layer.

11. The apparatus of claim 1, characterized as a perpendicular magnetic recording medium.

* * * * *